US008310936B2

(12) United States Patent
Li et al.

(10) Patent No.: US 8,310,936 B2
(45) Date of Patent: Nov. 13, 2012

(54) LINK SERVICES IN A COMMUNICATION NETWORK

(75) Inventors: Jian Li, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/178,048

(22) Filed: Jul. 23, 2008

(65) Prior Publication Data

US 2010/0020810 A1    Jan. 28, 2010

(51) Int. Cl.
*H04L 12/28* (2006.01)
(52) U.S. Cl. .................. 370/238; 370/395.32; 370/400
(58) Field of Classification Search .............. 370/238, 370/395.3, 395.32, 400
See application file for complete search history.

(56) References Cited

U.S. PATENT DOCUMENTS

| | | | | |
|---|---|---|---|---|
| 6,754,250 B2 * | 6/2004 | Haartsen | ................. | 375/132 |
| 6,795,688 B1 * | 9/2004 | Plasson et al. | ................. | 455/41.2 |
| 6,816,889 B1 * | 11/2004 | Graham | ................. | 709/213 |
| 6,965,568 B1 * | 11/2005 | Larsen | ................. | 370/238 |
| 7,219,220 B2 | 5/2007 | Cherukuri et al. | | |
| 7,266,614 B1 * | 9/2007 | Winkles et al. | ................. | 709/236 |
| 7,343,522 B2 * | 3/2008 | Ishii | ................. | 714/36 |
| 7,515,897 B2 * | 4/2009 | Suzuki | ................. | 455/343.2 |
| 7,532,594 B2 * | 5/2009 | Lin et al. | ................. | 370/329 |
| 7,551,568 B2 * | 6/2009 | Jeong et al. | ................. | 370/252 |
| 7,574,615 B2 * | 8/2009 | Weng et al. | ................. | 713/320 |
| 7,865,633 B2 * | 1/2011 | Wilkinson | ................. | 710/33 |
| 2005/0136867 A1 | 6/2005 | Carballo | | |
| 2005/0262284 A1 | 11/2005 | Cherukuri et al. | | |
| 2007/0234080 A1 | 10/2007 | Mackey et al. | | |

OTHER PUBLICATIONS

Marina Alonso et al.; "Dynamic Power Saving in Fat-Tree Interconnection Networks Using on/off Links"; Parallel and Distributed Processing Symposium; 2006 IPDPS, 20th International; Apr. 25-29, 2006.
Marina Alonso; "Power Saving in Regular Interconnection Networks Built With High-Degree Switches"; in Proceedings of the 19th IEEE Internation Parallel and Distributed Processing Symposium IPDPS 2005; IEEE Computer Scoiety Press, Denver CO; 2005.
Hang-Sheng Wang; "A Power Model for Routers: Modeling Alpha 21364 and Infiniband Routers"; IEEE Computer Society 2003; http://www-3.ibm.com/chips/products/infiniband/.
Li Shang et al.; "Dynamic Voltage Scaling With Links for Power Optimization of Interconnection Networks"; In Proceedings of the 9th International Symposium on High-Performance Computer Architecture (HPCA); Anaheim, CA, Jan. 2003.
Vassos Soteriou et al.; "Design Space Exploration of Power-Aware on/off Interconnection Networks"; In Proceedings of the 22nd International Conference on Computer Design (ICCD); San Jose, Oct. 2004.

* cited by examiner

*Primary Examiner* — Robert Wilson
*Assistant Examiner* — Brian O Connor
(74) *Attorney, Agent, or Firm* — Yudell Isidore Ng Russell PLLC

(57) ABSTRACT

In a communication network, links in a transmission path between source and destination terminals are sequentially switched to an operational state in response to a command or a group of commands for transmitting data prior to completion of assembling the data. Each node in the transmission path independently monitors transmission of data. After transmitting the data, the links are selectively switched to pre-determined power saving states.

17 Claims, 2 Drawing Sheets

LINK SERVICES IN A COMMUNICATION NETWORK

This invention was made with Government support under DARPA, HR0011-07-9-0002, PERCS Phase III. THE GOVERNMENT HAS CERTAIN RIGHTS IN THIS INVENTION.

BACKGROUND OF THE INVENTION

1. Technical Field

The present invention generally relates to communication networks and, in particular, to techniques for providing link services in a communication network.

2. Description of the Related Art

In communication networks, power consumption of interconnecting links constitutes a substantial portion of overall system power budget and may exceed the power needs of nodes (e.g., switches or servers) of the links. Conventionally, the interconnecting links are maintained in an operational state (i.e., a full-power data transmitting state) continuously. Alternatively, the links may be maintained at full power during time intervals scheduled based on predictions of the intensity of data traffic. However, powering the links of a communication network based upon traffic prediction may cause transmission delays or more power consumption or both, due to over-prediction or under-prediction.

SUMMARY OF ILLUSTRATIVE EMBODIMENTS

A method, system, and computer program product for providing link services in a communication network are disclosed.

In one embodiment, in a communication network, links in a transmission path between source and destination terminals are switched sequentially to an operational state in response to a command or a group of commands for transmitting data prior to completion of assembling the data. Data traffic through nodes of the links is independently monitored and, after completion of the transmission, the links are selectively switched from the operational state to one of predetermined power saving states.

All objects, features and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

Figure 1:
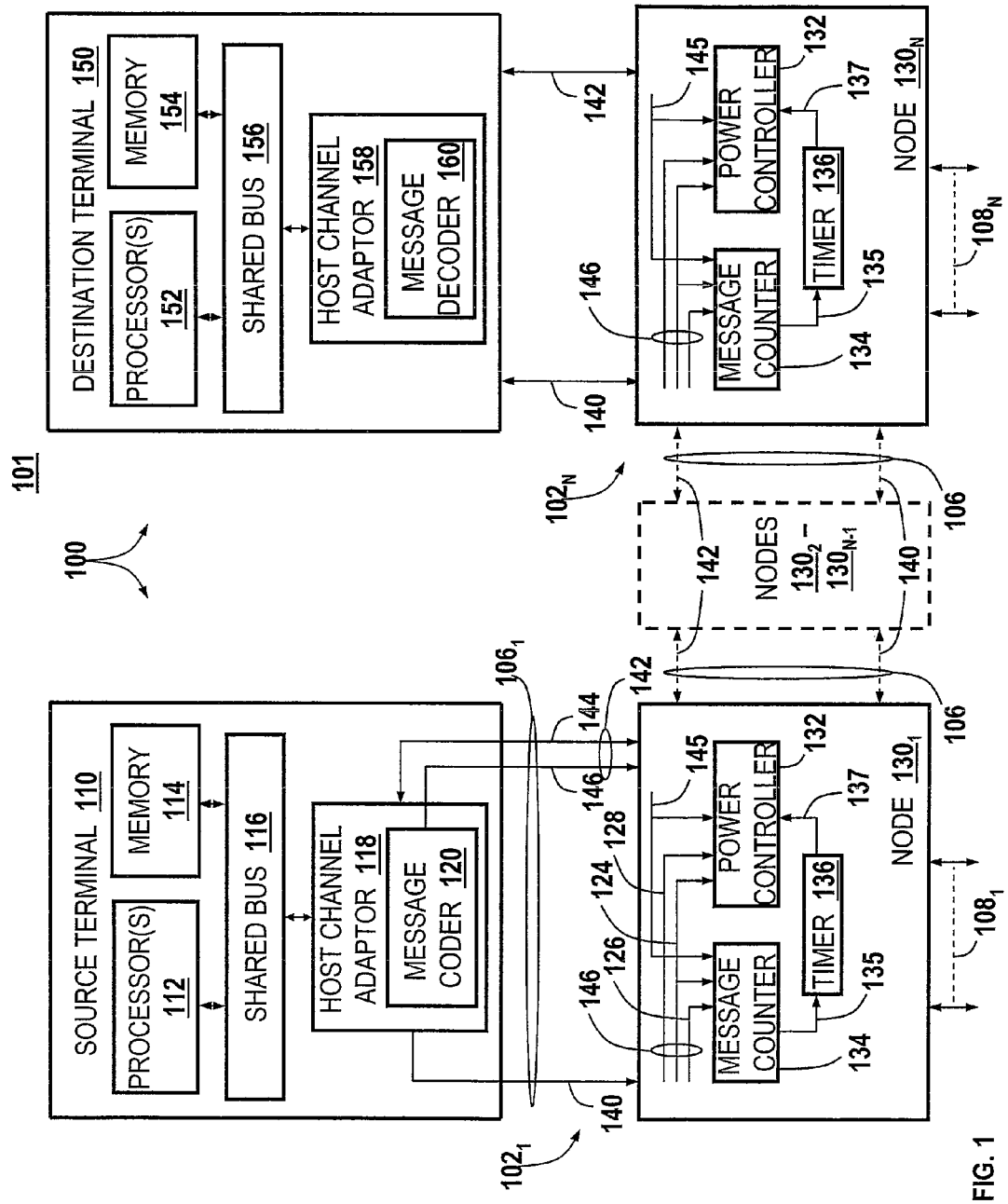
FIG. 1 is a high level block diagram of a transmission path in a communication network configured for implementing one or more embodiments of the invention.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION OF AN ILLUSTRATIVE EMBODIMENT

The present invention provides a method, system, and computer program product for providing link services in a communication network. The invention may advantageously be utilized in wired, wireless, and/or fiber-optic communication networks transmitting data in a form of packetized data messages. Examples of suitable communication networks also include high performance data processing systems having multiple processing nodes and using coherent data structures, such as Blue Gene™ and Deep Purple™ systems of IBM Corporation of Armonk, N.Y.

With reference now to the figures, and in particular with reference to FIG. 1, there is illustrated a high level block diagram of an illustrative embodiment of transmission path 100 of communication network 101 configured for implementing one or more embodiments of the invention. Transmission path 100 is a portion of network 101 and includes source terminal 110, destination terminal 150, and a plurality of links 102 (N links 102 are shown). In alternate embodiments (not shown), each of terminals 110, 150 may be coupled to links 102 via other links of sub-networks of network 101.

Each link 102 includes a node 130 (for example, a switch, a router, a server, or any combination thereof) and interface 106. Interface 106 couples node 130 to the source or destination terminal (nodes $130_1$, $130_N$) or to an adjacent intermediate node of transmission path 100. Via optional interfaces 108, nodes 130 of transmission path 100 may also be coupled to other nodes (not shown) of network 101 or nodes of other communication networks.

Interface 106 comprises data/address bus 140 and command bus 142, which includes (i) transmission control bus 144 and (ii) link power management bus 146. Interface 106 and component buses thereof may be implemented as wired, wireless, or fiber-optic interfaces or any combination of such interfaces. Transmission control bus 144 carries, among other signals, link activation signal 145 that switches links 102 to an operational state (i.e., full-power data transmitting state) or reinstates the current operational state thereof.

Source terminal 110 generally includes processor(s) 112, memory 114, shared bus 116, and host channel adaptor (HCA) 118 comprising message coder 120. In operation, HCA 118 receives a command or a group of commands to send data through transmission path 100. The command or the group of commands may be originated, for example, by a remote upstream processor (not shown) or generated locally by a processor 112. In response to the command or the group of commands to send data, HCA 118 generates and sends a link activation signal 145 via transmission control bus 144. In addition, one or more processors 112 initiate assembly of the data for transmission. For example, processor(s) 112 retrieves, via shared bus 116, data selected for transmission to destination terminal 150 from memory 114 and forwards the data to message coder 120. In this embodiment, links 102 are set to the operational state prior to completion of assembling and/or packetizing the data.

Message coder 120 transforms the data in packetized data messages compliant with a communication protocol of network 101, and HCA 118 generates control signals, which facilitate propagation and monitoring of data traffic through transmission path 100 and power management of links 102.

Thereafter, HCA 118 converts the data messages and control signals into a format compatible with transmission medium of links 102. For example, HCA 118 may convert the data messages and control signals into an optical format compatible with single-mode fibers of fiber-optic interfaces 106 and opto-electronic nodes 130. In operation, HCA 118 transmits the data messages and control signals into link $102_1$ via data/address bus $140_1$ and command bus $142_1$, respectively.

In one embodiment, component signals of link power management bus 146 include message initiation signal 124, message completion signal 126, and slack time signal 128. Signals 124 and 126 indicate a start and an end, respectively, of a transmission of a particular data message, and slack time signal 128 contains information predetermined by an intra-node communication protocol (e.g., the protocol of shared bus 116) regarding the slack time between receipt of the command to send data and the completion of assembling and/or packetizing the data.

Destination terminal 150 generally includes processor(s) 152, memory 154, shared bus 156, and HCA 158 comprising message decoder 160. In operation, HCA 158 converts data messages received from link $102_N$ coupled thereto in a data format compatible with shared bus 156, memory 154, and processor(s) 152. In one embodiment, message decoder 160 recovers the data transmitted from source terminal 110 and, via shared bus 156, forwards the recovered data to processor(s) 152 and/or memory 154 for further processing and/or storage.

In the depicted embodiment, each node 130 includes power controller 132, data message counter 134, and timer 136. In operation, power controller 132 selects a power state of interface 106 to an adjacent downstream node of transmission path 100. Such power controller 132, data message counter 134, and timer 136 may be implemented as hardware modules, software modules, firmware modules, or any combination thereof. In alternate embodiments, at least one of data message counter 134 and timer 136 may be a portion of power controller 132.

Power controller 132 receives message initiation signal 124, slack time signal 128, and output signal 137 of timer 136. Power controller 132 may switch link 102 between an operational (i.e., full power) state thereof and one of one or more predetermined power saving states, in which power consumption is less than in the operational state. For example, power controller 132 may switch link 102 to the operational state when link activation signal 145 asserts an active state, switch link 102 to a power saving state in response to an active state of signal 137, and select a particular power saving state based on information contained in slack time signal 128.

Message counter 134 monitors propagation of data messages through node 130. In one embodiment, counter 134 is an up/down counter incremented by an active state of message initiation signal 124, decremented by an active state of message completion signal 126, and reset/initiated by an active state of link activation signal 145. A zero output count signal 135 of such counter 134 is indicative of a completion of message flow (i.e., data traffic) through node 130.

Timer 136 receives output count signal 135 of message counter 134. In response to zero output count signal 135, after a pre-determined time delay $\Delta T$, timer 136 produces signal 137, which prompts power controller 132 to change a power state of link 102 (for example, to switch the link from an operational state to a power saving state).

Those of ordinary skill in the art will appreciate that hardware and software configurations depicted in FIG. 1 may vary. For example, other hardware and/or software components may be used in terminals 110, 150 and nodes 130 in addition to or in place of the depicted components.

Figure 2:
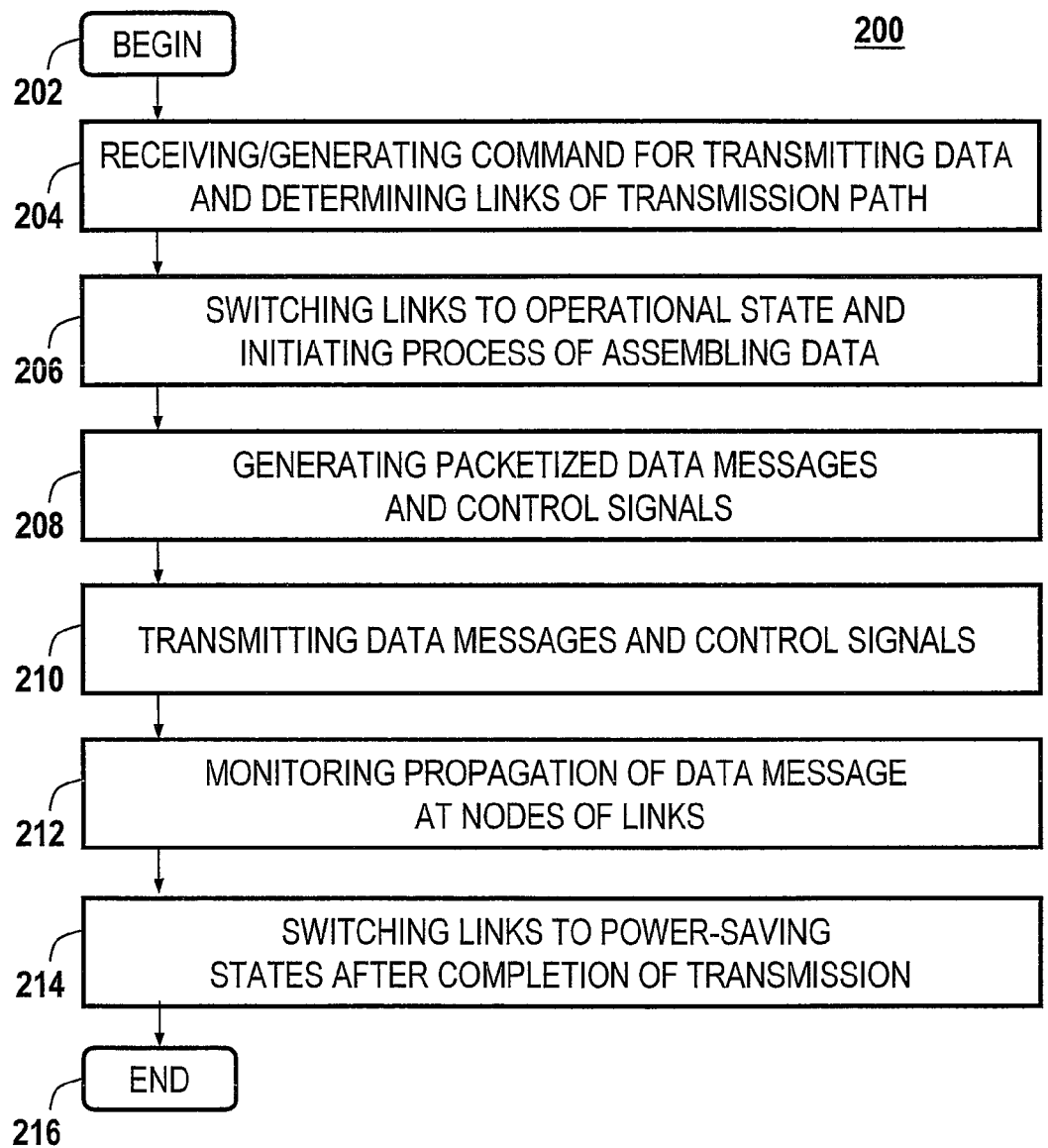
FIG. 2 is a high level flowchart of a process by which the features of the invention are implemented, according to one embodiment of the invention.

With reference now to FIG. 2, there is illustrated a high level logical flowchart of process 200 for providing link services in communication network 101 in accordance with one embodiment of the present invention. To best understand the invention, reference should be made to both FIGS. 1 and 2.

As shown, process 200 begins at block 202 and thereafter proceeds to block 204. At block 204, source terminal 110 receives from a remote upstream processor (not shown) or, alternatively, locally generates a command or a group of commands for transmitting data through transmission path 100. Then, using a destination address of the data and a routing diagram of network 101, HCA 118 determines the configuration (i.e., links 102) of transmission path 100 between source and destination terminals 110 and 150.

At block 206, in response to the command or the group of commands received at block 204 to transmit data, HCA 118 generates and sends link activation signal 145, and processor(s) 112 initiates a process of assembling the data for transmitting to destination terminal 150. Link activation signal 145 propagates through links 102, and switches the links to (or reinstates) an operational state thereof prior to completion of assembling and/or packetizing the data. Typically, links 102 are activated in an order the data propagates through the links (i.e., sequentially). In one embodiment, link activation signal 145 also initiates message counter 134 (or reinstates output signal 135 thereof), and links 102 are activated to the operational state using power controllers 132.

At block 208, processor(s) 112 completes assembly of the data (e.g., retrieves the data from memory 114) and forwards the data via shared bus 116 to HCA 118. At HCA 118, message coder 120 packetizes the data in data messages and supplements the data messages with control signals compliant with a communication protocol of network 101 and compatible with transmission medium of links 102.

At block 210, HCA 118 transmits the packetized data messages (bus 140) and the control signals (bus 142) into transmission path 100, where the packetized data messages and associated control signals sequentially propagate through links 102 of the transmission path.

At block 212, nodes 130 of links 102 monitor propagation of data messages therethrough to detect a completion of a transmission. In one embodiment, traffic of the data messages is monitored using initiation and completion signals 124 and 126 and up/down counter 134, as discussed above in reference to FIG. 1. In particular, completion of the transmission is detected when output count signal 135 of up/down counter 134 becomes equal to zero. If output count signal 135 remains equal to zero during a pre-determined time delay $\Delta T$, timer 136 produces signal 137 that triggers power controller 132 to change a power state of link 102. Otherwise, a non-zero state of signal 135 resets timer 136, and a current cycle of monitoring the traffic of data messages continues.

At block 214, after expiration of the time delay $\Delta T$, power controllers 132 selectively switch links 102 (e.g., switch power configurations of interfaces 106 thereof) from the operational state to one of power saving states. A particular power saving state is selected based on information contained in slack time signal 128. Upon completion of block 214, process 200 ends at block 216.

While the invention has been particularly shown as described with reference to a preferred embodiment, it will be understood by those skilled in the art that various changes in form and detail may be made therein without departing from the spirit and scope of the invention. For example, it will be appreciated that the concepts disclosed herein may be extended or modified to apply to other types of configuration entities than those disclosed herein. In addition, those skilled in the understand upon reference to the foregoing that any of a wide variety of rules may be applied to determine which configuration entities are presented, meaning that the particular syntax and presentation rules described herein are merely exemplary and not exhaustive.

Furthermore, although aspects of the present invention have been described with respect to a communication system executing software that directs the functions of the present invention, it should be understood that present invention may alternatively be implemented as a program product. Programs defining the functions of the present invention can be stored on a variety of computer-readable storage media, which include, without limitation, non-rewritable storage media (e.g., CD-ROM) and rewritable storage media (e.g., a floppy diskette, flash memory, or hard disk drive). It should be understood, therefore, that such computer-readable storage media, when storing computer readable instructions that direct the functions of the present invention, represent alternative embodiments of the present invention.

What is claimed is:

1. A method of providing link services in a communication network coupling a source terminal and a destination terminal, the method comprising:
   (a) in response to at least one command for transmitting data through a transmission path between the source and destination terminals, the transmission path including at least three links each including a respective one of a plurality of network nodes:
      the source terminal propagating a link activation along the transmission path to sequentially switch each of the at least three links of the transmission path to an operational state prior to data arrival at that link; and
      the source terminal initiating a process of assembling the data;
   (b) following the propagating, transmitting the assembled data in packetized data messages from the source terminal to the destination terminal via the transmission path;
   (c) independently monitoring propagation of the messages at the network node of each of the at least three links; and
   (d) each of the links switching to at least one power saving state in response to detecting completion of the propagation of the messages through that link.

2. The method of claim 1, wherein the step (a) further comprises:
   switching the links to the operational state in an order the messages propagate through the links.

3. The method of claim 1, wherein the step (c) further comprises:
   independently counting the messages at the network nodes of the links to detect the completion of the transmission.

4. The method of claim 3, and further comprising:
   counting the messages using counters incremented by incoming messages and decremented by outgoing messages.

5. The method of claim 1, wherein the step (d) further comprises:
   switching the links to the at least one power saving state upon expiration of a pre-determined time interval following detection of completion of the propagation of the messages.

6. The method of claim 1, wherein the step (d) further comprises:
   providing the network nodes with a slack between the at least one command to send data and completion of assembly of the data, said slack being predetermined by an intra-node communication protocol; and
   selecting the at least one power saving state based on said slack.

7. The method of claim 1, wherein the network nodes comprise switches, routers, servers, or any combination thereof.

8. A communication network, comprising:
   a source terminal, a destination terminal and a transmission path between the source and destination terminals;
   the transmission path including at least three links, each link having a network node that determines power states of that link, said power states including an operational state and at least one power saving state;
   wherein the source terminal, in response to at least one command for transmitting data through a transmission path, propagates a link activation along the transmission path to sequentially switch the at least three links of the transmission path to the operational state, initiates a process of assembling the data, and following propagation of the link activation transmits the assembled data in packetized data messages to the destination terminal via the transmission path; and
   wherein the network node of each of the at least three links independently monitors propagation of the messages, and responsive to detecting completion of the propagation of the messages through its link, selectively switches its link to the at least one power saving state.

9. The network of claim 8, wherein the source terminal comprises a host channel adaptor (HCA) configured for generating signals determining the power states of the links, said signals including the link activation, a message initiation signal, a message completion signal, and a slack time signal.

10. The network of claim 9, wherein each node further includes:
    an up/down counter of messages passing through the node, said up/down counter controlled using the message initiation and message completion signals; and
    a timer of a pre-determined time interval, said timer controlled by an output signal of the up/down counter.

11. The network of claim 10, wherein each node is configured for:
    switching the link to the operational state in response to the link activation;
    selecting the at least one power saving state using the slack time signal; and
    switching the node to the at least one power saving state in response to the output signal of the timer.

12. The network of claim 8, wherein each node comprises a switch, a router, or any combination thereof.

13. A computer program product for providing link services in a communication network, said computer program product comprising:
    a computer-readable storage medium; and
    computer program code within the computer-readable storage medium, said computer program code including instructions executable to perform:
       in response to at least one command for transmitting data through a transmission path between source and destination terminals, the transmission path including at least three links each including a respective one of a plurality of network nodes:
          (i) the source terminal propagating a link activation along the transmission path to sequentially switch each of the at least three links of the transmission path to an operational state prior to data arrival at that link, and (ii) the source terminal initiating a process of assembling the data;

following the propagating, transmitting the assembled data in packetized data messages;

independently monitoring propagation of the messages at the network nodes of the at least three links; and each of the links switching to at least one power saving state in response to detecting a completion of the propagation of the messages through that link.

14. The computer program product of claim 13, wherein propagating the link activation through the links comprises propagating the link activation through the links in an order by which the messages traverse the transmission path.

15. The computer program product of claim 13, wherein said monitoring comprises independently counting the messages at each network node using counters incremented by incoming messages and decremented by outgoing messages.

16. The computer program product of claim 13, wherein the switching comprises switching each link to the at least one power saving state upon expiration of a pre-determined time interval following detection of completion of the propagation of the messages through that link.

17. The computer program product of claim 13, wherein:

an intra-node communication protocol determines a slack between the at least one command to send data and completion of assembly of the data; and the instructions select the at least one power saving state based on said slack.

* * * * *